(12) United States Patent
Kanki

(10) Patent No.: US 10,191,648 B2
(45) Date of Patent: Jan. 29, 2019

(54) TOUCH DRAWING DISPLAY APPARATUS AND OPERATION METHOD THEREOF, IMAGE DISPLAY APPARATUS ALLOWING TOUCH-INPUT, AND CONTROLLER FOR THE DISPLAY APPARATUS

(71) Applicant: Sharp Kabushiki Kaisha, Osaka-shi, Osaka (JP)

(72) Inventor: Noriyoshi Kanki, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 46 days.

(21) Appl. No.: 14/823,681

(22) Filed: Aug. 11, 2015

(65) Prior Publication Data

US 2015/0346945 A1  Dec. 3, 2015

Related U.S. Application Data

(62) Division of application No. 13/370,049, filed on Feb. 9, 2012, now abandoned.

(30) Foreign Application Priority Data

Feb. 10, 2011 (JP) .................................. 2011-027236
Feb. 10, 2011 (JP) .................................. 2011-027237

(51) Int. Cl.
*G06F 3/0488* (2013.01)
*G06F 3/041* (2006.01)
*G06F 3/0485* (2013.01)

(52) U.S. Cl.
CPC .......... *G06F 3/0488* (2013.01); *G06F 3/0416* (2013.01); *G06F 3/0485* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| 5,111,316 A | 5/1992 | Nobile et al. |
| 5,276,787 A * | 1/1994 | Searby ................ G06F 3/04845 345/173 |
| 5,761,340 A | 6/1998 | Suzuki |
| 2003/0020687 A1* | 1/2003 | Sowden .............. G06F 3/03547 345/157 |

(Continued)

FOREIGN PATENT DOCUMENTS

| JP | 06-175776 A | 6/1994 |
| JP | 6-332611 A | 12/1994 |

(Continued)

*Primary Examiner* — Patrick Edouard
*Assistant Examiner* — Peijie Shen
(74) *Attorney, Agent, or Firm* — Birch, Stewart, Kolasch & Birch, LLP

(57) ABSTRACT

An electronic blackboard includes a display panel and a touch-panel, draws a line corresponding to a track formed by movement of the touched position on the displayed image, and erases an erroneously drawn line corresponding to a track specifying an operation other than drawing. In another aspect, an electronic blackboard includes a touch screen, a scroll unit for scrolling an image on the display screen when positions of multi-touch move in one same direction, and a page switching unit for detecting, after detection of multi-touch input, that a finger is moved away, and executing a process of returning the image on the display screen to a state before scrolling or a process of switching the image by one page in accordance with the moving direction of multi-touch positions, depending on whether the amount of movement of touch inputs is equal to or smaller than a threshold value.

6 Claims, 14 Drawing Sheets

(56) References Cited

U.S. PATENT DOCUMENTS

| | | | |
|---|---|---|---|
| 2004/0026605 A1 | 2/2004 | Lee et al. | |
| 2006/0001652 A1* | 1/2006 | Chiu | G06F 3/04855 345/173 |
| 2006/0038796 A1* | 2/2006 | Hinckley | G06F 3/03547 345/173 |
| 2007/0103452 A1 | 5/2007 | Wakai et al. | |
| 2009/0102806 A1* | 4/2009 | Tomkins | G06F 3/04883 345/173 |
| 2009/0160803 A1* | 6/2009 | Hashimoto | G06F 3/0488 345/173 |
| 2010/0201644 A1 | 8/2010 | Ohshita | |
| 2010/0309147 A1* | 12/2010 | Fleizach | G06F 3/04883 345/173 |
| 2011/0298724 A1* | 12/2011 | Ameling | G06F 3/04883 345/173 |
| 2013/0044066 A1* | 2/2013 | Monteux | G06F 3/0483 345/173 |
| 2014/0304625 A1* | 10/2014 | Ke | G06F 17/30905 715/760 |
| 2015/0169167 A1* | 6/2015 | Kim | G06F 3/0481 715/784 |

FOREIGN PATENT DOCUMENTS

| | | |
|---|---|---|
| JP | 08-076926 A | 3/1996 |
| JP | 09-231004 A | 9/1997 |
| JP | 10-124239 A | 5/1998 |
| JP | 11-102274 A | 4/1999 |
| JP | 2000-222130 A | 8/2000 |
| JP | 2001-117686 A | 4/2001 |
| JP | 2001-290585 A | 10/2001 |
| JP | 2004-078367 A | 3/2004 |
| JP | 2004-78957 A | 3/2004 |
| JP | 2007-316732 A | 12/2007 |
| JP | 2009-151691 A | 7/2009 |
| JP | 2010-113459 A | 5/2010 |
| JP | 2010-182197 A | 8/2010 |

* cited by examiner

TOUCH DRAWING DISPLAY APPARATUS AND OPERATION METHOD THEREOF, IMAGE DISPLAY APPARATUS ALLOWING TOUCH-INPUT, AND CONTROLLER FOR THE DISPLAY APPARATUS

CROSS-REFERENCE TO RELATED APPLICATION

This application is a Divisional of copending U.S. application Ser. No. 13/370,049, filed on Feb. 9, 2012, which claims priority under 35 U.S.C. § 119(a) to Patent Applications No. 2011-027236 and No. 2011-027237 filed in Japan on Feb. 10, 2011, all of which are hereby expressly incorporated by reference into the present application.

BACKGROUND OF THE INVENTION

Field of the Invention

The present invention relates to an image display apparatus having a display device and an input device integrated together, allowing touch-input. More specifically, the present invention relates to a touch drawing display apparatus that has functions of drawing operation and other operation regarding touch operations, and operation method thereof, as well as to an image display apparatus switching images page by page by touching and sliding images with a plurality of fingers and the like and a controller for the display apparatus.

Description of the Background Art

As an image display apparatus allowing touch-input, a so-called electronic blackboard having a display device with a large screen, allowing drawing of an image or other processes upon detection of touching of the display device by the user has been known. The electronic blackboard is useful when summarizing opinions of participants or finding a preferable solution to a problem, for example, at a meeting. Electronic blackboards having various configurations have come to be practically used, and one configured as a computer system having a combination of a display device with a large display screen and an input device for detecting two-dimensional position coordinates such as a touch-panel has been used.

Generally, an electronic blackboard apparatus successively reads pieces of information related to position coordinates designated by a pen or a finger and pieces of information related to amount of movement, and displays a track of inputs on the display device based on the read pieces of information. Consequently, the apparatus can realize operations as an electronic blackboard such as handwriting input.

Regarding the touch operation, Japanese Patent Laying-Open No. 6-175776 (hereinafter denoted as '776 Reference) discloses a projection type presentation device allowing drawing on a displayed screen image using touch operation. There is a problem that recognition of an original image becomes difficult when writing is repeated on the same screen image. In order to solve this problem, in the device disclosed in this reference, drawing is done while touch operation is continued in an image forming area, and when the touch operation in the image forming area once ends and then a touch operation in the image forming area is detected next, the former image is automatically deleted.

If a specific function other than drawing is allocated to a touch operation different from a simple touch operation for drawing in an electronic blackboard, while an image is being drawn in a drawing mode, it takes some time until a touch operation is determined to be the one for executing the specific function. Typically in an electronic blackboard, drawing is done immediately after the touching, so as not to cause any time lag between the touch operation and drawing. Any time lag is stressful for the user. Such a configuration sometimes leads to an erroneous drawing not intended by the user. By way of example, it is often the case that an operation of flicking with multi-touch (touching a plurality of points simultaneously) is allocated to an operation of scrolling screen images. In such a situation, if the user is drawing images with single-touch operation (touching one point at a time) and then makes a multi-touch flick operation for scrolling screen images, it is necessary to monitor the tracks of touched points for a prescribed time period to determine that it is a flick operation. As the image is drawn immediately in response to the touching to avoid any stress to the user, it follows that an erroneous image not intended by the user have been drawn by the time when the operation is determined to be the multi-touch flick operation. While the image with the erroneous drawing disappears from the screen image when the screen images are scrolled, drawing information containing the erroneous drawing is stored as it is. Therefore, when scrolled back to the original screen image, the erroneous drawing again appears on the screen image. When printing is done, similarly, the erroneous drawing is also printed.

This problem is not limited to the electronic blackboard, and it occurs in display devices allowing display of images drawn by touching, such as tablet-type terminals. This problem cannot be solved by the technique disclosed in '776 Reference.

Advantages of an electronic blackboard include that it is possible to display or write (draw) images separately on a plurality of screen images. Each unit of display of such images is referred to as a "page" as an analogy to a book.

In an electronic blackboard allowing display of a plurality of pages of images, how to switch pages easily is an issue. The easiest method may be to provide a button for switching pages on the screen image. This method, however, is problematic particularly when the screen image is large, as it becomes difficult for the user to press the button depending on the position of the user.

In view of the foregoing, other than the method using the button, a method of switching the screen images by touching the screen image with a finger and sliding the same is proposed. Here, if it is too simple, the operation would be the same as the usual drawing operation. Therefore, in order to distinguish the two different operations, Japanese Patent Laying-Open No. 11-102274 (hereinafter referred to as '274 Reference) proposes a device in which the screen image is switched if the screen image is touched by a plurality of fingers and the like (a so-called multi-touch) and the plurality of touched positions are slid by more than a prescribed value in the same direction.

Japanese Patent Laying-Open Nos. 8-76926 (hereinafter referred to as '926 Reference) and 9-231004 (hereinafter referred to as '004 Reference) disclose methods as further development of the idea described above. According to the method described in '926 Reference, when an operation of touching and sliding is done, a page is turned, and the number of pages turned at one time is changed depending on the number of touching fingers (the number of touched positions). According to the method disclosed in '004 Reference, scrolling of images, turning of pages and moving of cursors are executed in accordance with the movement and number of fingers touching the display screen surface.

According to the techniques disclosed in '274, '926 and '004 References described above, it is possible to turn pages by the simple operation of touching and sliding. There is still a problem to be solved. Specifically, pages may be turned erroneously while normal input is being done. Particularly when input is being done using a finger, it is possible that a finger other than the finger used for input happens to touch the screen surface and is detected as the multi-touch slide input and, as a result, a page is turned unintentionally. Therefore, a mechanism that can prevent unintended turning of a page even when such an erroneous input is made has been desired. Further, a mechanism that allows the user to easily understand what manner of input is necessary to turn a page is also necessary.

SUMMARY OF THE INVENTION

In view of the problems described above, it is desired to provide a touch drawing display apparatus and operation method thereof that can maintain correct drawing of images even when a touch operation other than the image drawing is made in the drawing mode.

Further, it is desired to provide an image display apparatus allowing touch-input that allows the user to intuitively understand the method of page-by-page switching of screen images using multi-touch and that can prevent any trouble of display when an erroneous operation is made on such an occasion.

Further, it is desired to provide an image display apparatus allowing touch-input that allows the user to intuitively understand the method of page-by-page switching of screen images using multi-touch, and of which switching operation is easy.

According to a first aspect, the present invention provides a touch drawing display apparatus, including: a display unit that displays an image; a detecting unit that is arranged on the display unit and detects a touched position; a drawing unit that draws, on an image displayed on the display unit, a line corresponding to a track formed by movement of the detected position; and an erasing unit that erases, when an operation other than drawing is specified by the track, a line drawn from a start point to an end point of the track specifying the operation.

Preferably, the track for specifying the operation other than drawing is a track formed by a multi-touch operation of simultaneously touching a plurality of positions of the detecting unit.

According to a second aspect, the present invention provides a method of operating a touch drawing display apparatus that includes a display unit that displays an image and a detecting unit that is arranged on the display unit and detects a touched position, including the steps of: drawing, on an image displayed on the display unit, a line corresponding to a track formed by movement of the detected position; determining whether or not an operation other than drawing is specified by the track while the drawing step is being executed; and erasing, if an operation other than drawing is specified by the track, a line drawn from a start point to an end point of the track specifying the operation.

As described above, according to the present invention, when a touch operation other than that for drawing images is made in the drawing mode, the erroneous image drawn during the determination of the touch operation other than that for drawing is not retained, and the drawn image as intended by the user can be stored. Therefore, when the object image is displayed again, the erroneous image is not displayed and only the intended image is displayed.

According to a third aspect, the present invention provides an image display apparatus allowing touch-input, including: a touch detecting unit that has a display screen, displays page images page by page on the display screen, and detects positions and the number of touch inputs that designate positions on the display screen; a scroll unit that scrolls, when a plurality of touch inputs are detected by the touch detecting unit and their positions on the display screen move in one same direction, an image displayed on the display screen along with movement of positions of the plurality of touch inputs; and a first page switching unit that detects, after the plurality of touch inputs are detected by the touch detecting unit, decrease in the number of touch inputs from an output of the touch detecting unit and, depending on whether an amount of movement of the touch inputs is not larger than a first threshold value, selectively executes a process of returning the image on the display screen to a state before scrolling and a process of switching the image on the display screen by one page in accordance with the direction of movement of the plurality of touch inputs.

When touching of the display screen surface with a plurality of fingers, that is, so-called multi-touch, is detected by the touch detecting unit and the touched positions move in the same direction, the scroll unit scrolls the screen image in that direction. Therefore, the user can intuitively understand that the screen image can be scrolled by multi-touch sliding operation. On the other hand, if the amount of movement is not larger than the first threshold value and the number of multi-touching decreases after the multi-touch sliding is done, the scroll made by that time point is resumed to the original state before scrolling. Therefore, even when the user erroneously touches the display screen surface with a plurality of fingers and slides, the original screen image can be resumed if the user becomes aware and moves his/her fingers away immediately. If the multi-touch sliding exceeding the first threshold value is done and then the user moves away his/her fingers from the screen, the screen image is switched by one page in accordance with the direction of sliding. Thus, the pages of screen image can be switched by the simple operation of multi-touch sliding.

As a result, an image display apparatus allowing touch-input that allows the user to intuitively understand the method of page-by-page switching of screen images using multi-touch and that can prevent any trouble of display when an erroneous operation is made on such an occasion can be provided.

According to a fourth aspect, the present invention provides a controller for a display apparatus, used for the display apparatus that has a display screen, displays an image received from outside on the display screen and detects and outputs, to the outside, positions and the number of touch inputs that designate positions on the display screen. The controller for the display apparatus includes: a scroll unit that generates, when it is detected that a plurality of touch inputs are detected by the display apparatus and their positions on the display screen move in one same direction, an image by scrolling the image displayed on the display screen along with the movement of positions of the plurality of touch positions, and applies the generated image to the display apparatus; and a page switching unit that detects, after the plurality of touch inputs are detected by the display apparatus, decrease in the number of touch inputs from an output of the display apparatus, depending on whether an amount of movement of the touch inputs is not larger than a first threshold value, selectively executes a process of generating page image data for returning the image on the display screen to a state before scrolling and a process of generating page image data for switching the image on the display screen by one page in accordance with the direction of movement of the plurality of touch inputs, and transmits the generated page image data to the display apparatus.

According to a fifth aspect, the present invention provides an image display apparatus allowing touch input, including: a touch detecting unit that has a display screen, displays page images page by page on the display screen, and detects positions and the number of touch inputs that designate positions on the display screen; a scroll unit that scrolls, when a plurality of touch inputs are detected by the touch detecting unit and their positions on the display screen move in one same direction, an image displayed on the display screen along with movement of positions of the plurality of touch inputs; a page switching unit that switches, in response to an amount of movement of the plurality of touch inputs exceeding a threshold value during scrolling of the image by the scroll unit, the image on the display screen by one page in accordance with the direction of movement of the plurality of touch inputs; and a returning unit that detects, from an output of the touch detecting unit, decrease of the number of plurality of touch inputs before page switching by the page switching unit during scrolling of the image by the scroll unit, and returns scrolling of the image by the scroll unit to a state before scrolling.

The plurality of touched positions are detected by the touch detecting unit, and when these positions move in the same direction, the scroll unit moves the screen image along the direction of movement of the touched positions. Therefore, the user can intuitively understand that page switching is possible by the so-called multi-touch. Further, if the plurality of touched positions move in the same direction and the threshold value is exceeded, the display of screen image is switched in accordance with the direction of movement of touched positions in the course of scrolling. The screen image can be switched by the simple operation of so-called multi-touch. Further, for this purpose, what is necessary is simply to move the touched positions continuously without moving the fingers and the like away from the screen surface. Further, if the number of touch inputs decreases before page switching takes place, the screen image returns to the state before the scrolling and, therefore, the original state can easily be resumed even when an erroneous operation is made.

As a result, an image display apparatus allowing touch-input that allows the user to easily understand that page-by-page switching of screen images is possible by multi-touch input and allows easy switching of page-by-page switching of screen images can be provided.

According to a sixth aspect, the present invention provides a controller for a display apparatus, used for the display apparatus that has a display screen, displays an image received from outside on the display screen and detects and outputs, to the outside, positions and the number of touch inputs that designate a position on the display screen. The controller includes: a scroll unit that generates, when it is detected that a plurality of touch inputs are detected by the display apparatus and their positions on the display screen move in one same direction, an image by scrolling the image displayed on the display screen along with the movement of positions of the plurality of touch positions, and applies the generated image to the display apparatus; a page switching unit that switches, in response to an amount of movement of the plurality of touch inputs exceeding a threshold value during scrolling of the image by the scroll unit, the image on the display screen by one page in accordance with the direction of movement of the plurality of touch inputs; and a returning unit that detects, from an output of the display apparatus, decrease of the number of plurality of touch inputs before page switching by the page switching unit during scrolling of the image by the scroll unit, and returns scrolling of the image by the scroll unit to a state before scrolling.

As described above, according to the present invention, the user can intuitively understand that page-by-page switching of screen images can be done by using multi-touch, and any trouble in display can be prevented even when an erroneous operation is made on such an occasion. Further, by a simple operation of multi-touch sliding, page of images can be switched by one page. It is unnecessary to stop the multi-touch sliding operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
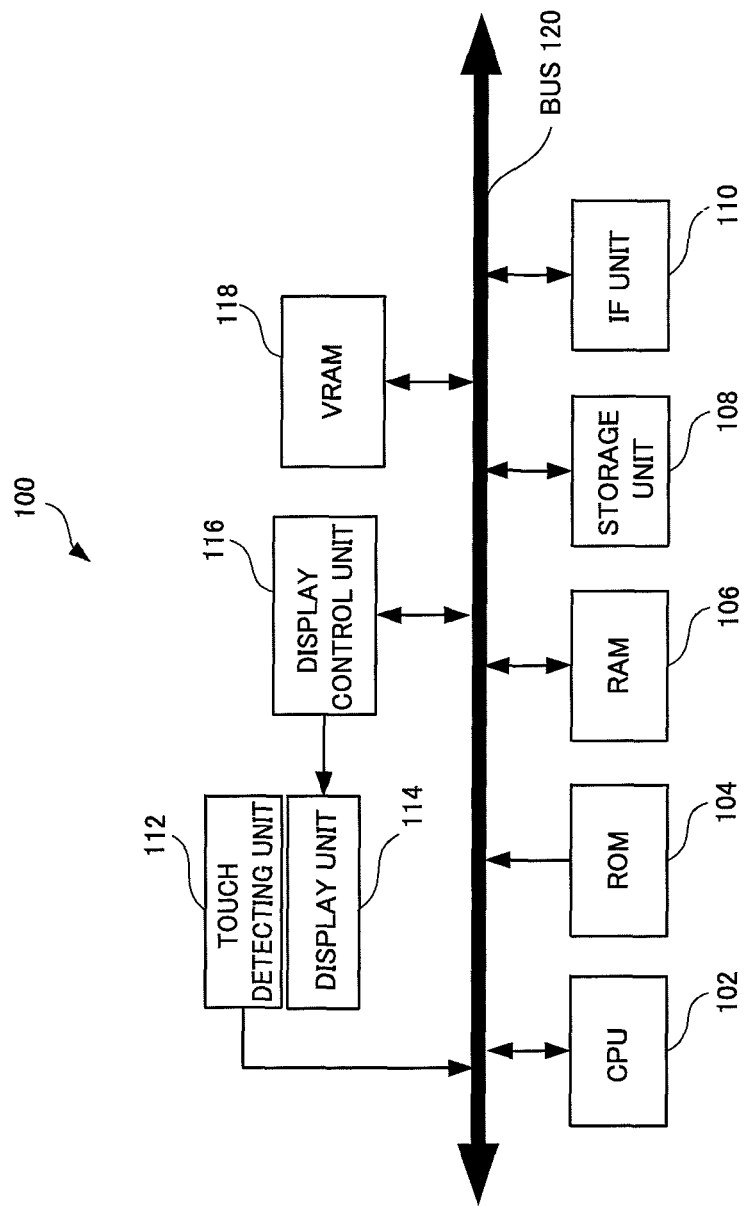
FIG. 1 is a block diagram showing a schematic configuration of an electronic blackboard in accordance with an embodiment of the present invention.

In the following description and in the drawings, the same components are denoted by the same reference characters. Their names and functions are also the same. Therefore, detailed description thereof will not be repeated.

In the following, the term "touch" means that a position is made detectable by an input position detecting device, and "touch" may include touching and pressing the detecting device, just touching and not pressing the detecting device, and coming very close to but not touching the detecting device. As will be described later, a contact type as well as a non-contact device may be used as the input position detecting device. Where the non-contact type detection device is used, "touch" means coming very close to the detecting device, that is, to a distance that allows detection of the input position.

First Embodiment

[Configuration]

Referring to FIG. 1, an electronic blackboard apparatus 100 in accordance with the first embodiment of the present invention includes: a central processing unit (hereinafter denoted as CPU) 102; a read only memory (hereinafter denoted as ROM) 104; a random access memory (hereinafter denoted as RAM) 106; a storage unit 108; an interface unit (hereinafter denoted as IF unit) 110; a touch detecting unit 112; a display unit 114; a display control unit 116; a video memory (hereinafter denoted as VRAM) 118; and a bus 120. CPU 102 is for overall control of electronic blackboard apparatus 100.

ROM 104 is a non-volatile storage storing programs and data necessary for controlling operations of electronic blackboard apparatus 100. RAM 106 is a volatile storage. Storage unit 108 is a non-volatile storage retaining data even when power conduction is shut off, and implemented, for example, by a hard disk drive, a flash memory or the like. Storage unit 108 may be configured as a detachable unit. CPU 102 reads a program from ROM 104 to RAM 106 through bus 120 and executes the program using a part of RAM 106 as a work area. CPU 102 controls various units and components of electronic blackboard apparatus 100 in accordance with a program or programs stored in ROM 104.

To bus 120, CPU 102, ROM 104, RAM 106, storage unit 108, IF unit 110, touch detecting unit 112, display control unit 116 and VRAM 118 are connected. Data (including control information) is exchanged between each of the units through bus 120.

IF unit 110 is for establishing connection with the outside such as a network, and transmits/receives image data to and from a computer or the like connected to the network. Image data received from the outside through IF unit 110 is recorded in storage unit 108.

Display unit 114 is a display panel (such as a liquid crystal panel) for displaying images. Display control unit 116 is provided with a driving unit for driving display unit 114. Display control unit 116 reads image data stored in VRAM 118 at prescribed timing, generates signals for displaying as an image on display unit 114, and outputs the generated signals to display unit 114. The image data to be displayed is read by CPU 102 from storage unit 108 and transmitted to VRAM 118.

Touch detecting unit 112 is, for example, a touch-panel, detecting a touch operation by a user. Here, if there is a plurality of positions touched by the user, touch detecting unit 112 successively outputs coordinates of each of the positions. As a result, by monitoring the outputs of touch detecting unit 112, it is possible to know the number of touched positions and their coordinates successively. Detection of touch operation when a touch-panel is used for touch detecting unit 112 will be described with reference to FIG. 2.

Figure 2:
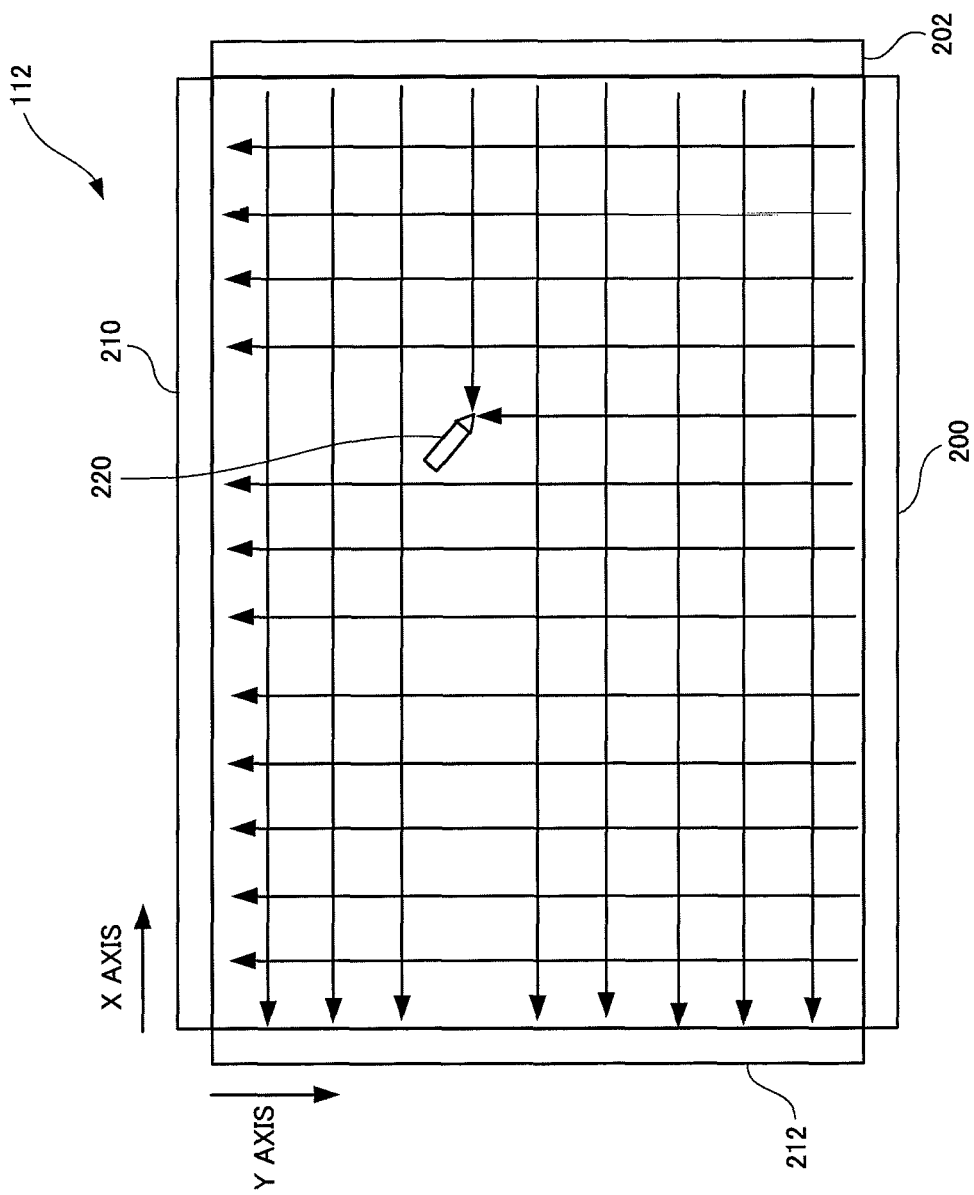
FIG. 2 shows an example of a method of detecting a touch-input.

FIG. 2 shows an infrared scanning type touch-panel (touch detecting unit 112). The touch-panel has arrays of light emitting diodes (hereinafter denoted as LED arrays) 200 and 202 arranged in a line on adjacent two sides of a rectangular writing surface, respectively, and two arrays of photodiodes (hereinafter referred to as PD arrays) 210 and 212 arranged in a line opposite to LED arrays 200 and 202, respectively. Infrared rays are emitted from each LED of LED arrays 200 and 202, and the infrared rays are detected by each PD of opposite PD arrays 210 and 212. In FIG. 2, infrared rays output from LEDs of LED arrays 200 and 202 are represented by arrows.

The touch-panel includes, for example, a micro computer (a device including a CPU, a memory and an input/output circuit), and controls emission of each LED. Each PD outputs a voltage corresponding to the intensity of received light. The output voltage from the PD is amplified by an amplifier. Since signals are output simultaneously from the plurality of PDs of PD arrays 210 and 212, the output signals are once saved in a buffer and then output as serial signals in accordance with the order of arrangement of PDs, and transmitted to the micro computer. The order of serial signals output from PD array 210 represents the X coordinate. The order of serial signals output from PD array 212 represents the Y coordinate.

When a user touches a point on the touch-panel with a touch pen 220, the infrared ray is intercepted by the tip of touch pen 220. Therefore, the output voltage of PD that has been receiving the infrared ray before the interception drops. Since the signal portion from the PD that corresponds to the touched position (XY coordinates) decreases, the micro computer detects a portion where the signal levels of received two serial signals decreased, and thereby finds the position coordinates of the touched position. The micro computer transmits the determined position coordinates to CPU 102. The process for detecting the touched position is repeated periodically at prescribed detection interval and, therefore, if one point is kept touched for a time period longer than the detection interval, it follows that the same coordinate data is output repeatedly. The touched position can be detected in the similar manner when the user touches touch detecting unit 112 with his/her finger without using touch pen 220.

The technique for detecting the touched position described above is well known and, therefore, further description will not be given here. A touch panel other than the infrared scanning type panel (such as a capacitive type, surface acoustic wave type or resistive type touch panel) may be used as touch detecting unit 112. When a capacitive touch panel is used, a position can be detected even when a finger or the like is not actually touching (non-contact), if it is close enough to the sensor.

Figure 3:
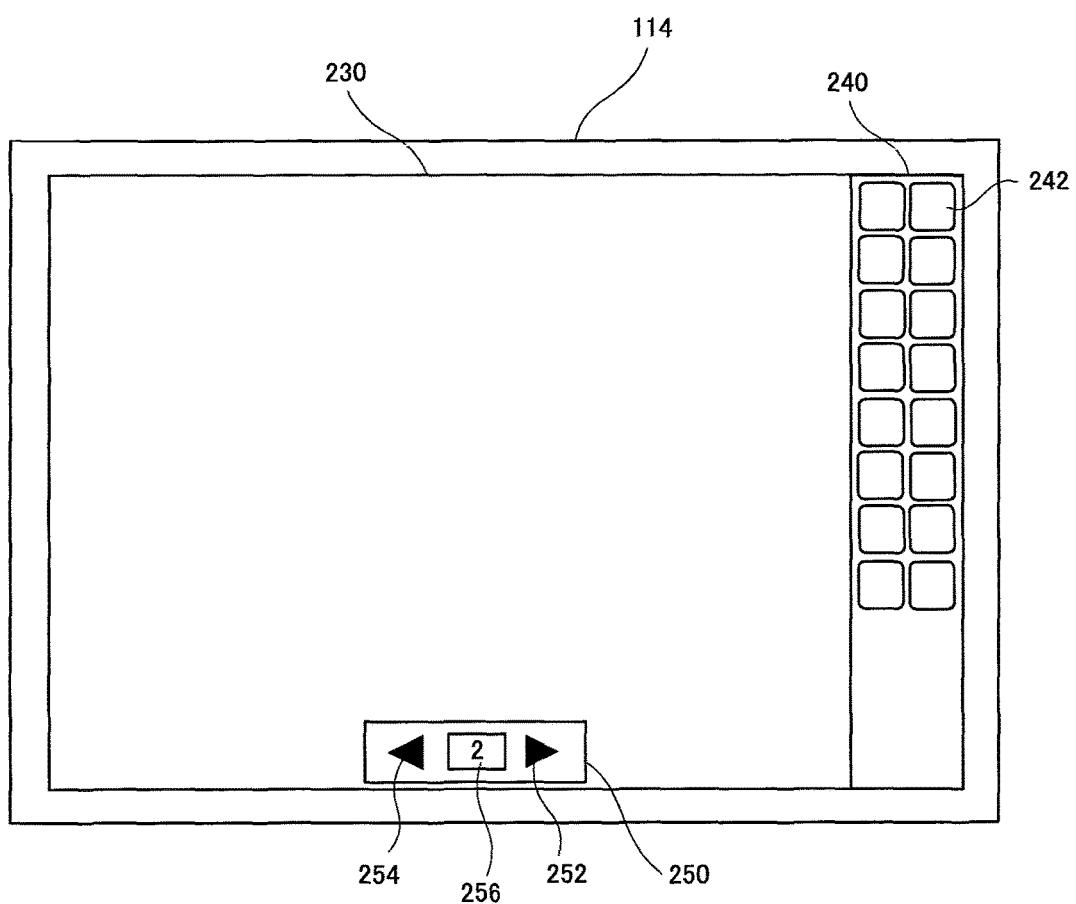
FIG. 3 shows an example of a displayed screen image.
Figure 4:
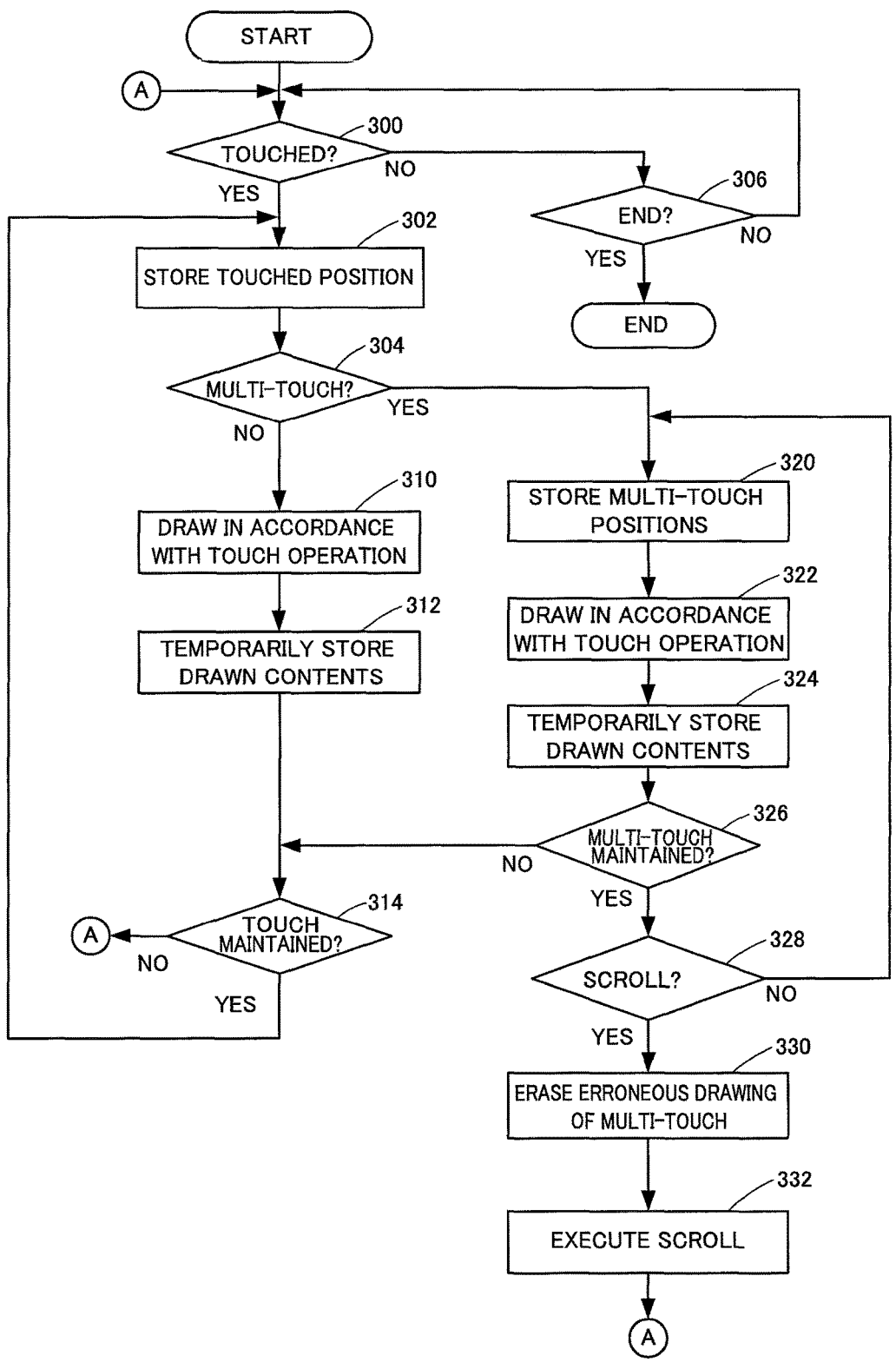
FIG. 4 is a flowchart representing a control structure of a program realizing erasure of an erroneous drawing in the electronic blackboard apparatus in accordance with a first embodiment of the present invention.

On display unit 114, a screen image such as shown in FIG. 3 is displayed. The display screen image of display unit 114 is divided to a drawing area 230 and a function button area 240. Drawing area 230 is for the user to draw an image by touching operations. Specifically, XY coordinates of touched position and track of its movement are transmitted from touch detecting unit 112 to CPU 102 as described above. In accordance with the received coordinate data, CPU 102 writes a prescribed value in a corresponding memory address on VRAM 118. While pixel values of image data on VRAM 118 may be changed, here, it is assumed that VRAM 118 is provided with an area (hereinafter also referred to as an overlay area) for storing drawing data, separate from the area for storing image data. Assuming that data of a memory address where drawing is not done of the overlay area is "0", CPU 102 writes "1" to a memory address that corresponds to the drawn position. Display control unit 116 superimposes and displays on display unit 114 the image data with the drawing data (the data in the overlay area). Specifically, on a point where the drawing data exists (the pixel having "1" recorded in the overlay area), the drawing data (preset color) is displayed, and on a point where the drawing data does not exist (the pixel having "0" recorded in the overlay area), the image data is displayed.

On function button area 240, function buttons 242 each having specific function allocated thereto are displayed. At a lower portion of drawing area 230, a page operation area 250 is displayed. On this area, a NEXT button 252, a PREVIOUS button 254 and a page number indication box 256 are displayed. When touched, NEXT button 252 feeds the displayed page (image data) to the right and shows the next page. When touched, PREVIOUS button 254 feeds the displayed page to the left and shows the previous page. Page number indication box indicates the page number of the currently displayed page, of the plurality of pages as the object of display. The position of page operation area 250 is fixed and it does not move even during scrolling. By way of example, the data for displaying page operation area 250 on display unit 114 may be stored in an overlay area separate from the overlay area for drawing.

When the user touches NEXT button 252, coordinate data of the touched position is transmitted from touch detecting unit 112 to CPU 102. CPU 102 determines that the received coordinate data represents a position in the area where NEXT button 252 is displayed. As a result, CPU 102 transmits image data of the next page to VRAM 118, and transmits a page feed command to display control unit 116. In response, display control unit 116 generates a signal for displaying an image in the course of page feed from the image data corresponding to the currently displayed page and the image data corresponding to the next page on VRAM 118, and outputs it to display unit 114. Consequently, an image in the course of page feed appears on display unit 114. It is noted that only a frame of the currently displayed image may be moved on the display screen image of display unit 114 in the course of page feed.

Functions allocated to function buttons 242 may include: a function of drawing by a touch operation (allowing selection of types of pens for drawing); a function of opening a file (image data) saved in storage unit 108; an erasure function of deleting a drawing in a prescribed area; a function of saving displayed image data in storage unit 108; and a function of printing displayed image data. Each function button 242 is displayed as an icon.

In the following, a method of operating electronic blackboard apparatus 100, particularly a control structure of a program realizing the process for not leaving any erroneous drawing when a function other than drawing is allocated to a special touch operation, will be described. In the following description, it is assumed that the function button for drawing has been pressed in the screen image shown in FIG. 3 and electronic blackboard apparatus 100 is in a mode that drawing starts when drawing area 230 of touch detecting unit 112 is touched. Further, it is assumed that the special touch operation is a flick operation to the right/left with multi-touch at two or more points. Scroll to the right is allocated to a right-flick operation with multi-touch, and scroll to the left is allocated to a left-flick operation with multi-touch. It is further assumed that no process other than drawing is allocated to any other multi-touch operation.

At step 300, CPU 102 determines whether or not touch detecting unit 112 is touched. As described above, CPU 102 determines whether or not coordinate data is received from touch detecting unit 112. Position coordinates (X coordinate, Y coordinate) of the touched point are output in the order of touching, from touch detecting unit 112. If it is determined that there is a touch, the control proceeds to step 302. Otherwise, the control proceeds to step 306.

At step 302, CPU 102 stores coordinate data that have been received for a prescribed time period (coordinate data of touched points) in RAM 106 in a manner that represents the order of reception. At step 306, CPU 102 determines whether or not the program is to be ended. When an end button as one of the function buttons 242 is pressed, CPU 102 ends the program. Otherwise, the control returns to step 300, and CPU 102 waits for a touch.

At step 304, CPU 102 determines whether or not the touch detected at step 302 is a multi-touch (whether a plurality of points are touched simultaneously). Specifically, CPU 102 calculates, among the plurality of coordinate data stored at step 302, the distance between the first received coordinate data and the coordinate data received next. If the distance is a prescribed value or larger, CPU 102 determines that it is a multi-touch, and if the distance is smaller than the prescribed value, determines that it is a single touch.

The touch detection interval (period) is short and touching to each point involves slight time difference and, therefore, even in the case of multi-touch, coordinate data are output in order of touching from touch detecting unit 112. Therefore, by calculating the distance between the coordinate data received first and each of some coordinate data received second and thereafter, it is possible to determine whether the touch was a single touch or a multi-touch. The number of points touched simultaneously in the multi-touch operation is not limited to two and may be three or more. Therefore, distances are calculated for a plurality of continuous points. The distance used as a reference for determining a multi-touch may be set appropriately. What is necessary is that the distance as the reference is larger than the normal distance the user moves the touched point in the detection interval. If it is determined to be a multi-touch, the control proceeds to step 320. If it is determined not to be a multi-touch, the control proceeds to step 310.

At step 310, CPU 102 draws an image in accordance with the track of movement of the touched point, on the image displayed on display unit 114. Specifically, CPU 102 reads the plurality of coordinate data stored at step 302 from RAM 106, and writes prescribed data on corresponding points in the overlay area of VRAM 118 and on points on lines connecting these points in order. Consequently, the image data and the drawing data (data in the overlay area) are combined and displayed on display unit 114, as if drawing is done on the image. Since the process at step 312 is repeated as described later, the overlay area is overwritten with existing drawing data left as it is.

At step 312, CPU 102 temporarily stores the contents of drawing in RAM 106. What is required is that the drawing can be reproduced and, hence, the method of storage may appropriately be selected. By way of example, the coordinate data stored in RAM 106 at step 302 with the order maintained may be retained as they are. Alternatively, the data in the overlay area of VRAM 118 may be stored as two-dimensional image data in RAM 106.

At step 314, CPU 102 determines whether or not the touch is maintained. Specifically, CPU 102 determines whether or not coordinate data are continuously received from touch detecting unit 112. For instance, if touch pen 220 or the user's finger moves away, reception of coordinate data from touch detecting unit 112 stops. If it is determined that the touch is maintained, control returns to step 302, and the process following step 302 is repeated. If it is not determined that the touch is maintained, the control returns to step 300 and CPU 102 again waits for a next touch.

Figure 5:
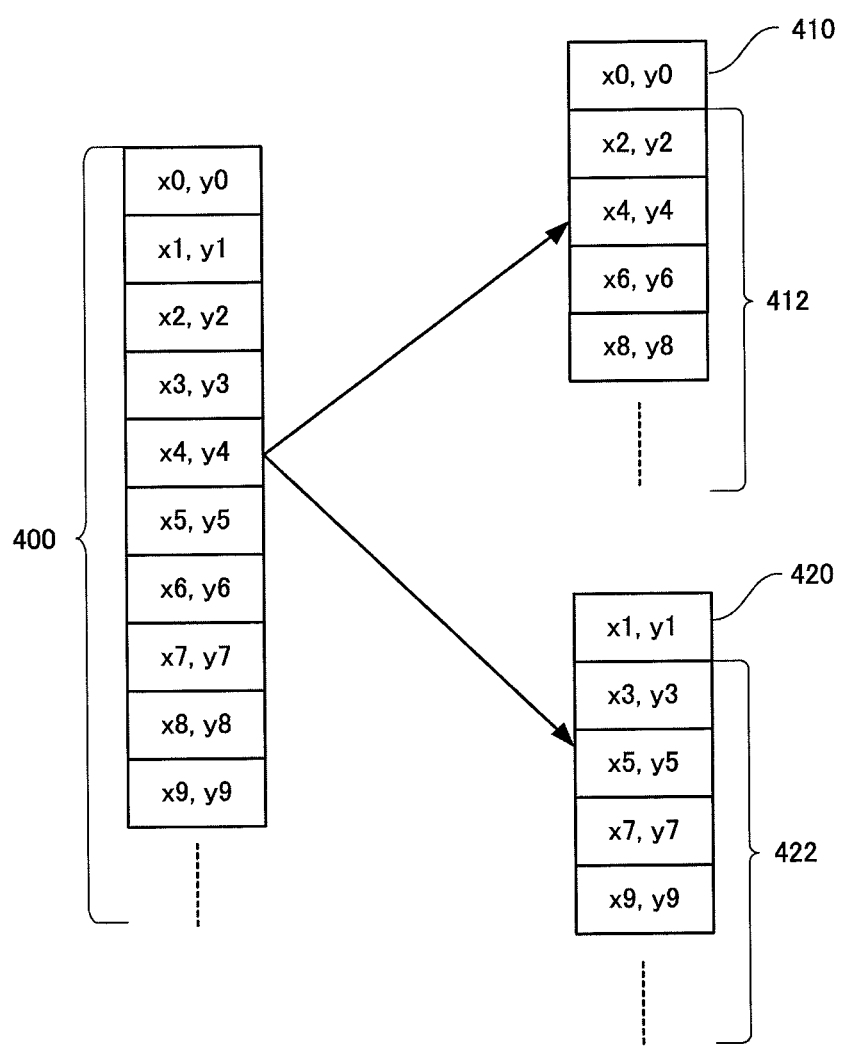
FIG. 5 shows coordinate data structure stored when a multi-touch operation is carried out in accordance with the first embodiment of the present invention.

At step 320, CPU 102 re-stores the coordinate data that have been stored at step 302 in RAM 106 as coordinate data corresponding to each multi-touch position, that is, for each track, in RAM 106. By the process of step 304, for each of the plurality of points touched simultaneously, the coordinate data of first touched point (hereinafter also referred to as "start point") have been determined. Therefore, it is possible to determine which of the plurality of coordinate data other than the start point stored in RAM 106 corresponds to the track of which of the plurality of start points, based on the distance from the start point. In accordance with the result of determination, the coordinate data of the start point and the coordinate data of points on the track of movement of the start point are stored as sequence data, in the order of detection. Assume, for example, that two points were touched simultaneously. At step 302, sequence data 400 shown on the left side of FIG. 5 are stored in RAM 106. Of these, (x0, y0) and (x1, y1) are assumed to be the coordinates of two points that were touched first. The point (x0, y0) was touched little earlier than the point (x1, y1). Here, two data sequences having coordinate data 410 of the first start point and coordinate data 420 of the second start point as heads, respectively, such as shown on the right side of FIG. 5, are stored in RAM 106. Coordinate data 410 of the start point and the following data sequence 412 represent one track. Coordinate data 420 of the start point and the following data sequence 422 represent another track. The manner of storage is similar if the number of multi-touch points is three or more.

Figure 6:
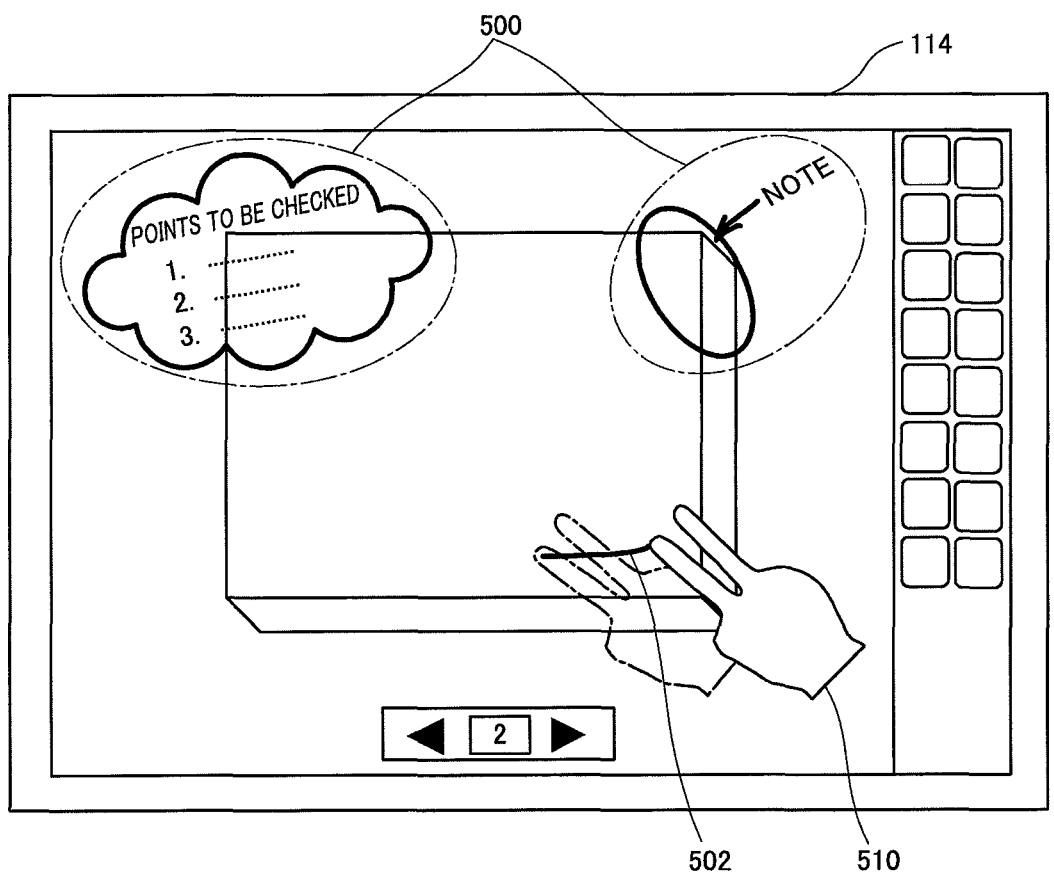
FIG. 6 shows a scroll operation realized by the multi-touch operation in accordance with the first embodiment of the present invention.

At step 322, CPU 102 draws an image on the image displayed on display unit 114, in accordance with the track of touched points as at step 310. CPU 102 draws using the coordinate data re-stored in RAM 106 as shown, for example, in FIG. 5. All tracks of simultaneously touched points may be drawn, or a track or tracks of only one or some of the points (for example, a track of the earliest-touched point) may be drawn. FIG. 6 shows an example in which drawings 500 are made and thereafter, a user 510 flicked to the right while multi-touching with two fingers. By this operation, erroneous drawing 502 is made on the image. In FIG. 6, only a drawing corresponding to one of the two tracks is displayed. If step 312 has already been executed and drawing with single touch has been made, the contents of drawing by the multi-touch is added to the drawn contents.

At steps 324, CPU 102 temporarily stores the contents drawn at step 322 in RAM 106. The specific method is the same as that of step 312. If the coordinate data re-stored at step 320 is to be retained as it is, different from step 312, only the coordinate data representing the track drawn at step 322 may be retained.

At step 326, CPU 102 determines whether the multi-touch is maintained. Specifically, CPU 102 determines whether or not a plurality of coordinate data are continuously received from touch detecting unit 112 and whether these coordinate data correspond to the tracks of a plurality of start points determined at step 320. By way of example, assume that the user first touched with two fingers and then moved one finger away. Then, the track that has been made by the moved finger is lost, and the coordinate data received from touch detecting unit 112 come to be only the coordinate data representing one track. Considering a situation that three or more points are touched at first, it is determined that multi-touch is maintained if simultaneous touching of at least two points is continued. If it is determined that multi-touch is maintained, the control proceeds to step 328. If it is not determined that multi-touch is maintained, the control proceeds to step 314, and CPU 102 determines whether or not single touch is maintained, as described above.

At step 328, CPU 102 determines whether or not the detected multi-touch operation is an operation allocated to scrolling (an operation designating a scroll). Specifically, for each sequence of coordinate data corresponding to the tracks of the plurality of touch points stored at step 320, CPU 102 determines a vector from the coordinate data of the start point to the coordinate data of the last point, and determines whether the vector is of a prescribed length or longer and whether the vector is in the positive direction along the X axis (whether X component is positive). If the vector is in the positive direction along the X axis, the detected multi-touch operation is determined to be an operation allocated to a scroll to the right. If the vector is of a prescribed length or longer and in the negative direction along the X axis (X component is negative), the detected multi-touch operation is determined to be an operation allocated to a scroll to the left. If it is determined to be an operation allocated to a scroll, the control proceeds to step 330. Otherwise, the control returns to step 320. The process following step 320 is repeated until the vector reaches the prescribed length.

Figure 7:
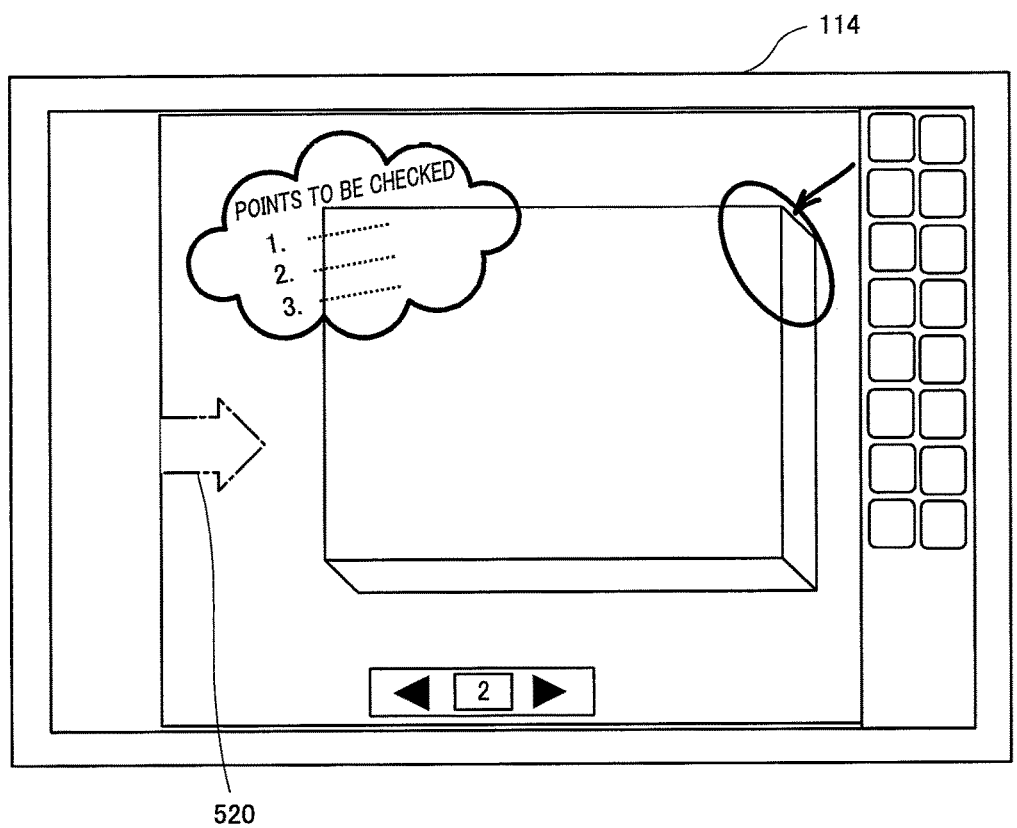
FIG. 7 shows a scroll of a screen image in accordance with the first embodiment of the present invention.

At step 330, CPU 102 deletes the coordinate data representing the track of touched point stored in RAM 106 at step 324. Specifically, CPU 102 deletes the drawing data written after the determination of multi-touch (for example, write data "0"), while maintaining the drawing data (for example, drawing data drawn with single touch) written before the determination of multi-touch in the overlay area. Therefore, on the screen image of display unit 114, the erroneous line drawn by the multi-touch operation is erased. FIG. 7 shows a displayed screen image on display unit 114 during a scroll. An arrow 520 represents a scroll to the right. In FIG. 7, drawing 500 formed by the user and displayed in FIG. 6 is maintained, while erroneous drawing 502 is erased. Since FIG. 7 shows a state in which scroll to the right has already been done to some extent, part of the drawing on the upper right portion is not shown.

At step 332, CPU 102 executes the right or left scroll, in accordance with the result of determination at step 328. Before executing the scroll, CPU 102 saves the contents of drawing (with the erroneous drawing erased) that have been temporarily stored in RAM 106 at steps 312 and 324 in storage unit 108, and the control returns to step 300. Since the contents drawn in the overlay area are saved in storage unit 108, the image with drawing 500 intended by the user can again be displayed if a left scroll is designated later.

By the above-described process, in electronic blackboard apparatus 100 in accordance with the first embodiment, when a left or right flick operation is done with multi-touch by a user, the erroneous line drawn by the multi-touch before the start of scrolling is not left and only the drawing intended by the user is saved, and then the scroll can be executed.

Though an example in which the image read from storage unit 108 is displayed as a background has been described above, it is not limiting. The background may be a uniform color image (for example, white, black or gray), provided that a function of drawing in response to a touch operation on touch detecting unit 112 is realized.

Though an example in which the special touch operation represents a left/right scroll operation, that is, an example in which the scroll function is allocated to the special touch operation, has been described above, it is not limiting. The function to be allocated may be any operation other than drawing and it may be an upward/downward scroll, a scroll to a diagonal direction, or a page switch without scroll. Further, the function to be allocated may be a function (operation) other than drawing, allocated to a function button. If an operation allocated to a scroll in a direction other than the left/right direction is to be detected, the scrolling direction may be determined considering not only the X component but also the Y component of the vector.

Further, it is possible that a plurality of users touch electronic blackboard apparatus 100, each with a touch pen or a finger, and to draw a plurality of images simultaneously. In order to distinguish such drawing operations from the operation allocated to the scroll described above (the operation of left/right flick with multi-touch), what is necessary is to determine whether the distance of points touched simultaneously is about the distance between one's fingers (for example, at most a few centimeters).

As to the operation to which a function other than drawing is allocated, it is not limited to a multi-touch operation, and it may be a single-touch operation provided that the operation can be distinguished from the normally conducted touch operation for drawing. By way of example, if a track from the start point to the end point of a single-touch operation (a figure drawn continuously without lifting one's finger or pen) is a prescribed shape, the allocated operation other than drawing may be executed.

Though an example in which CPU 102 determines whether or not an operation is a multi-touch operation has been described above, it is not limiting. By way of example, a micro computer in touch detecting unit 112 may determine whether or not an operation is a multi-touch operation, and may transmit the result to CPU 102.

Though an electronic blackboard apparatus has been described above, it is not limiting, and the present invention is generally applicable to display apparatuses that allow drawing and operation of screen images by touching, including tablet type terminal devices.

Second Embodiment

[Configuration]
An electronic blackboard apparatus in accordance with the second embodiment of the present invention has the same configuration as that shown in FIG. 1 representing the electronic blackboard apparatus in accordance with the first embodiment. The method of detecting a touch input and the displayed screen images of the electronic blackboard apparatus in accordance with the second embodiment are also the same as those described with reference to FIGS. 2 and 3 regarding the electronic blackboard apparatus in accordance with the first embodiment. Therefore, in the following, the electronic blackboard apparatus in accordance with the second embodiment will be described as "electronic blackboard apparatus 100", referring to FIGS. 1 to 3 where appropriate.

A program realizing the page switch function of electronic blackboard apparatus 100 in accordance with the second embodiment using the hardware shown in FIG. 1 when executed by CPU 102 shown in FIG. 1 has the following control structure.

Figure 8:
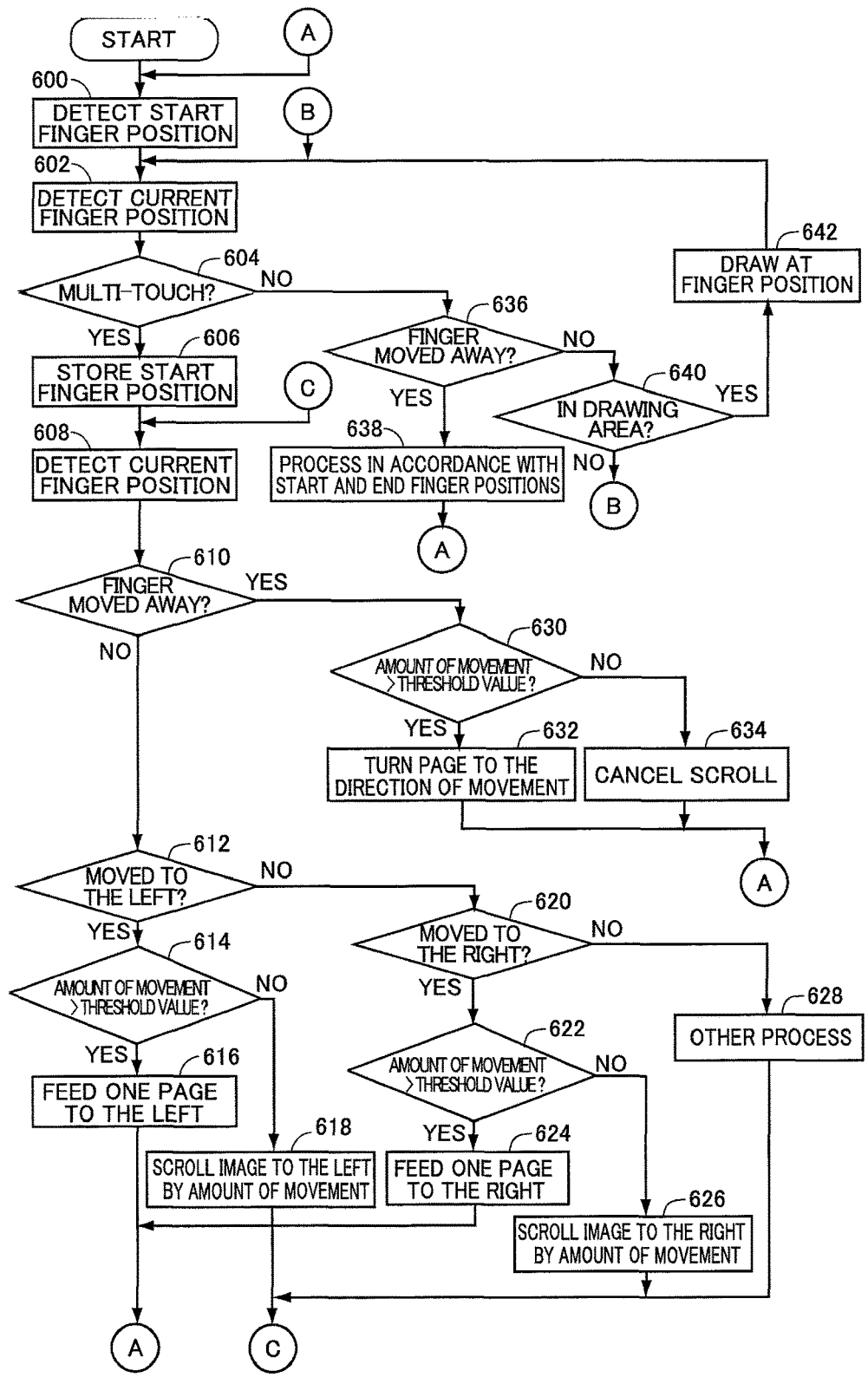
FIG. 8 is a flowchart representing a control structure of a program realizing page switching by a multi-touch, in the electronic blackboard apparatus in accordance with a second embodiment of the present invention.

Referring to FIG. 8, the program includes steps 600, 602 and 604. At step 600, CPU 102 monitors an output of touch detecting unit 112, and in response to an output detecting a touch by the user from touch detecting unit 112, the control flow proceeds to the next step. At step 602, CPU 102 again detects a new position of touching by a finger based on an output from touch detecting unit 112, and the control proceeds to the next step. At step 604, based on the results from steps 600 and 602, CPU 102 determines whether or not the touch by the user is a multi-touch made with two or more fingers. Touch detecting unit 112 has a function of outputting coordinate data whose number corresponds to the number of touching, in response to the touching by the user. Therefore, the determination as described above can be made based on the outputs from touch detecting unit 112.

The program further includes a step 606. At step 606, CPU 102 stores, if the determination at step 604 is positive, the touch positions detected at steps 600 and 602 in RAM 106 (see FIG. 1). Since a multi-touch is detected, here, coordinate values corresponding in number to the number of detected touches are stored. In the subsequent process, the coordinate data of each finger are detected for every detected touch position, and the series of data are stored as a sequence in RAM 106.

The program further includes steps 608, 610 and 630. At step 608, following step 606, CPU 102 detects the present positions of fingers from the outputs of touch detecting unit 112. At step 610, based on the result of detection at step 608, CPU 102 determines whether any one of the multi-touch detection outputs is lost (whether or not any finger has been moved away from touch detecting unit 112). If the determination at step 610 is positive, at step 630, CPU 102 compares the X coordinate of the last detected finger position with the X coordinate of the first finger position stored at step 606, and determines whether or not an absolute value of difference between the two coordinates is larger than a threshold value $D_{TH1}$. In the present embodiment, direction of page movement is along the lateral direction of drawing area 230 (FIG. 3) and, therefore, X coordinates of finger positions are compared as described above.

If the determination at step 630 is positive, at step 632, a page displayed in drawing area 230 is changed in accordance with the direction of finger movement. Specifically, if the direction of finger movement is to the left in FIG. 3, the next page of the current page is displayed on drawing area 230, and if it is to the right, the previous page of the current page is displayed on drawing area 230. If the determination at step 630 is negative, at step 634, CPU 102 cancels scrolling of the image displayed in drawing area 230. In the present embodiment, if fingers are slid to the left/right in the state of multi-touch, the image scrolls to the left/right correspondingly. Therefore, if the length of sliding is equal to or smaller than the threshold value $D_{TH1}$, it is necessary that the screen image display must be returned to the original state. At step 634, the display on drawing area 230 is returned from the scrolled image to the display of original page. After the process of steps 632 and 634, the control flow returns to step 600, to wait for detection of the next position of touching.

If the determination at step 610 is negative, that is, if it is determined that all positions of multi-touch are maintained, at step 612, CPU 102 determines whether or not finger positions detected at step 608 are all in the left direction when viewed from the finger positions recorded at step 606.

If the determination is positive, at step 614, CPU 102 calculates the amount of movement (absolute value of difference in X coordinate values), and determines whether or not the value is larger than a threshold value $D_{TH2}$. In the present embodiment, the threshold value $D_{TH2}$ here is larger than the threshold value $D_{TH1}$ at step 630. Further, in the present embodiment, the amount of movement is an average value of all amounts of movement of multi-touch finger positions.

If the determination at step 614 is positive, at step 616, CPU 102 sets the screen image to be displayed on drawing area 230 to be the image of previous one page. Specifically, if the current image is of the second page, the image of the first page is displayed on drawing area 230 by the process of step 616. Thereafter, the control flow returns to step 600. On the other hand, if the determination at step 614 is negative, at step 618, CPU 102 scrolls the screen image displayed on drawing area 230 to the left by the same length as the amount of movement of finger positions calculated at step 614. At this time, if there is a previous page, the left end of the page is displayed at the right side of drawing area 230. Then, the control flow proceeds to step 608.

If the determination at step 612 is negative, at step 620, CPU 102 determines whether or not the finger positions detected at step 608 are in the right direction when viewed from the finger positions recorded at step 606. If the determination is positive, at step 622, CPU 102 calculates the amount of movement (absolute value of difference in X coordinate values), and determines whether or not the value is larger than a threshold value $D_{TH3}$. The threshold value here is the same as the threshold value $D_{TH2}$ at step 614.

If the determination at step 622 is positive, at step 624, CPU 102 sets the screen image to be displayed on drawing area 230 to be the image of next one page. Specifically, if the current image is of the second page, the image of the third page is displayed on drawing area 230. Thereafter, the control flow returns to step 600. On the other hand, if the determination at step 622 is negative, CPU 102 scrolls the screen image displayed on drawing area 230 to the right by the same length as the amount of movement of finger positions calculated at step 622. At this time, if there is a next page, the right end of the page is displayed at the left side of drawing area 230. Then, the control flow proceeds to step 608.

If the determination at step 620 is negative, that is, if X coordinates of finger positions are unchanged, the control proceeds to step 628. At step 628, CPU 102 executes a predetermined process in accordance with the values of X and Y coordinates of finger positions or history thereof. The process that takes place at step 628 may include a process of updating display, when a specific button is pressed with multi-touch, when a specific plurality of buttons are pressed with multi-touch, when a so-called pinch-out is done with the space between fingers made wider, or a so-called pinch-in is done with the space between fingers made narrower. At step 628, such a process is done. Since the contents of processing at step 628 are not related to the present invention, detailed description thereof will not be given here, for simplicity of description. After step 628, the control flow returns to step 608.

The control structure of the routine realizing the process for multi-touch operation is as described above.

If it is determined at step 604 that the detected finger position is one and it is not a multi-touch operation, the process following step 636 is executed. At step 636, CPU 102 determines whether or not the finger has moved away from drawing area 230 of touch detecting unit 112.

If the determination at step 636 is positive, at step 638, based on the finger position at the start of touching detected at step 600 and the finger position immediately before detection of the finger moved away at step 604, CPU 102 executes a process in accordance with these positions. By way of example, the process when function button 242, NEXT button 252 or PREVIOUS button 254 shown in FIG. 3 is pressed corresponds to the process that is executed here. Thereafter, the control flow returns to step 600, and the output of touch detecting unit 112 is monitored until the next touch is detected.

If the determination at step 636 is negative, it means that only one finger position is continuously being detected. Here, at step 640, CPU 102 determines whether or not the detected finger position is in drawing area 230. If the determination at step 640 is positive, at step 642, CPU 102 draws an image in accordance with drawing settings at that time on the finger position. Thereafter, the control flow returns to step 602. If the determination at step 640 is negative, drawing is unnecessary and, therefore, the control flow directly returns to step 602.

[Operation]

Electronic blackboard apparatus 100 operates in the following manner. In the following, the operation of electronic blackboard apparatus 100 related mainly to the page feed will be described. Operations of portions not specifically related to the present invention will not be given here.

Figure 9:
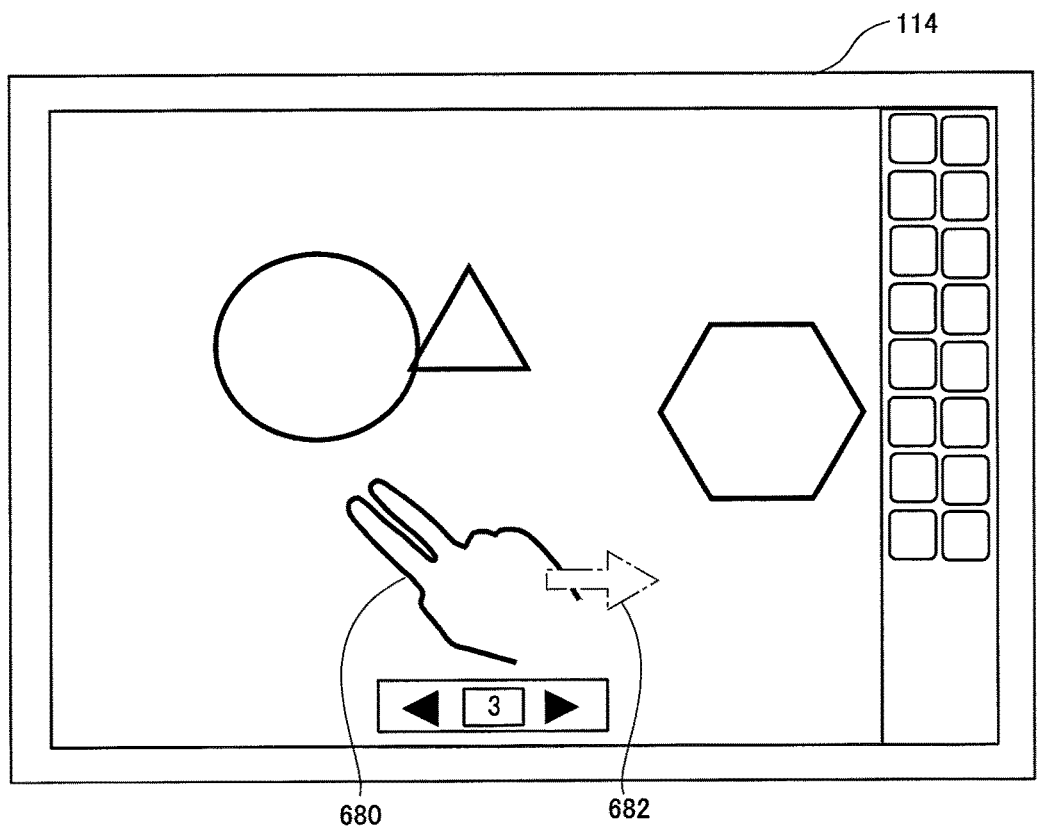
FIG. 9 shows a multi-touch sliding operation in accordance with the second embodiment of the present invention.

Referring to FIG. 9, assume that the third page of a document is displayed on the screen of display unit 114. Here, assume that a user 680 touches the screen surface of display unit 114 with two fingers, and slides the two fingers to the right as represented by an arrow 682, with the fingers kept in touch with the surface. The amount of sliding here is a distance $D_1$, which is smaller than the threshold value $D_{TH1}$.

Referring to FIG. 8, the control flow of the program at this time will be described. At step 600, the first finger position is detected and, thereafter, the next finger position is detected at step 602. Here, the operation is multi-touch operation and, therefore, the determination at step 604 is YES. The first touched positions of two fingers are stored in RAM 106 at step 606. At step 608, current finger positions are again detected. Assuming that the user continues sliding as shown in FIG. 9, the determination at step 610 is negative. Therefore, at step 612, whether or not the two finger positions are moving to the left is determined. Here, the two finger positions are both moving to the right. Therefore, the result of determination is negative. As a result, the control proceeds to step 620. At step 620, whether or not the finger positions are moving to the right is determined. In the state shown in FIG. 9, the result of determination is positive. Therefore, next, at step 622, whether or not the amount of movement of the fingers is larger than the threshold value $D_{TH1}$ is determined. At the beginning of repetition, the amount of movement is smaller than the threshold value arm. Therefore, the result of determination is negative. As a result, the screen image is displayed scrolled to the right by the amount equal to the amount of movement of the fingers (average of the amounts of movement of two finger positions) at step 626. Thereafter, the control returns to step 608 and the next repetition process starts.

Figure 10:
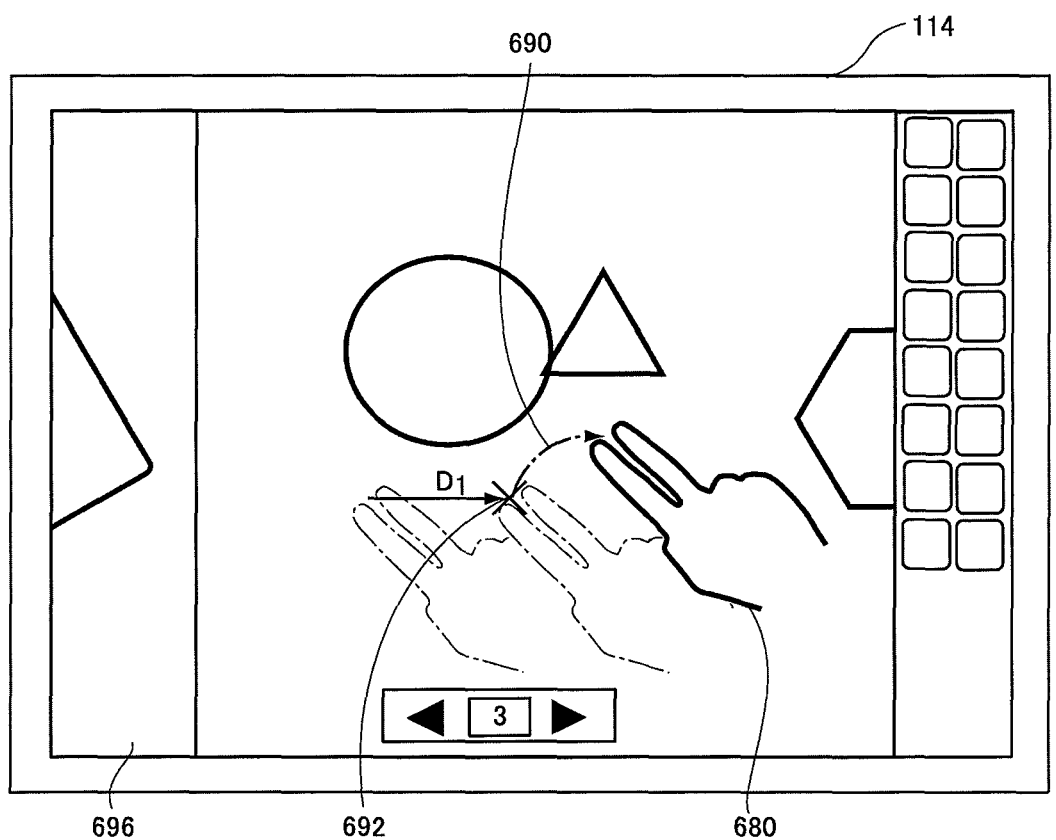
FIG. 10 shows an operation of sliding by a distance $D_1$ with multi-touch and then moving the fingers away, in accordance with the second embodiment of the present invention.

When the user continues sliding, the process described above is repeated time and again. As a result, if the distance $D_1$ of finger movement is equal to or smaller than the threshold value $D_{TH1}$, the display on display unit 114 is as shown in FIG. 10. Referring to FIG. 10, assume that user 680 touches the display surface with his/her fingers and slides the two fingers by the distance $D_1$ ($\leq D_{TH1}$) with the fingers kept in touch with the display surface. The screen image is scrolled to the right by the same distance as $D_1$. As a result, on the left end of the screen image, a right end portion 696 of the image of the next page is displayed.

Assume that after sliding his/her fingers by the distance $D_1$(<$D_{TH1}$) to position 692, the user moves his/her fingers away from the display surface as shown by an arrow 690 and stops sliding. Here, the result of determination at step 610 of FIG. 8 becomes positive, and the control proceeds to step 630. Since $D_1 \leq D_{TH1}$, the determination at step 630 is negative, and scroll is canceled at step 634. As a result, the screen image returns to the state shown in FIG. 9.

Figure 11:
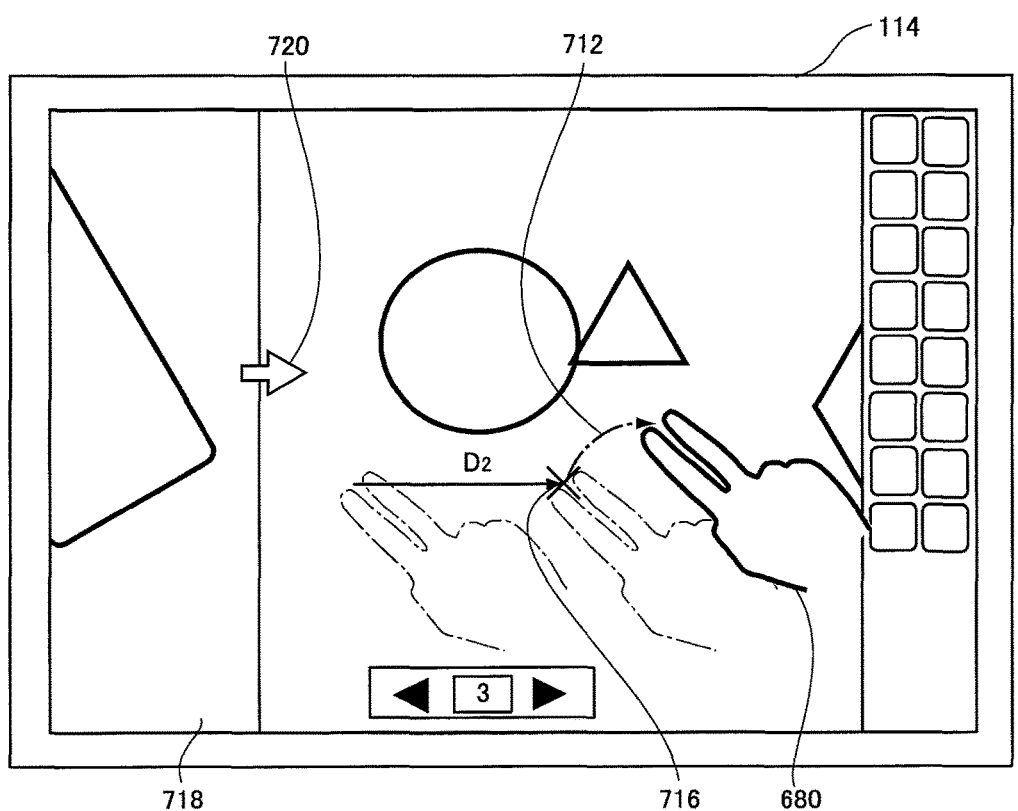
FIG. 11 shows an operation of sliding by a distance $D_2$ longer than $D_1$ with multi-touch and then moving the fingers away, in accordance with the second embodiment of the present invention.
Figure 12:
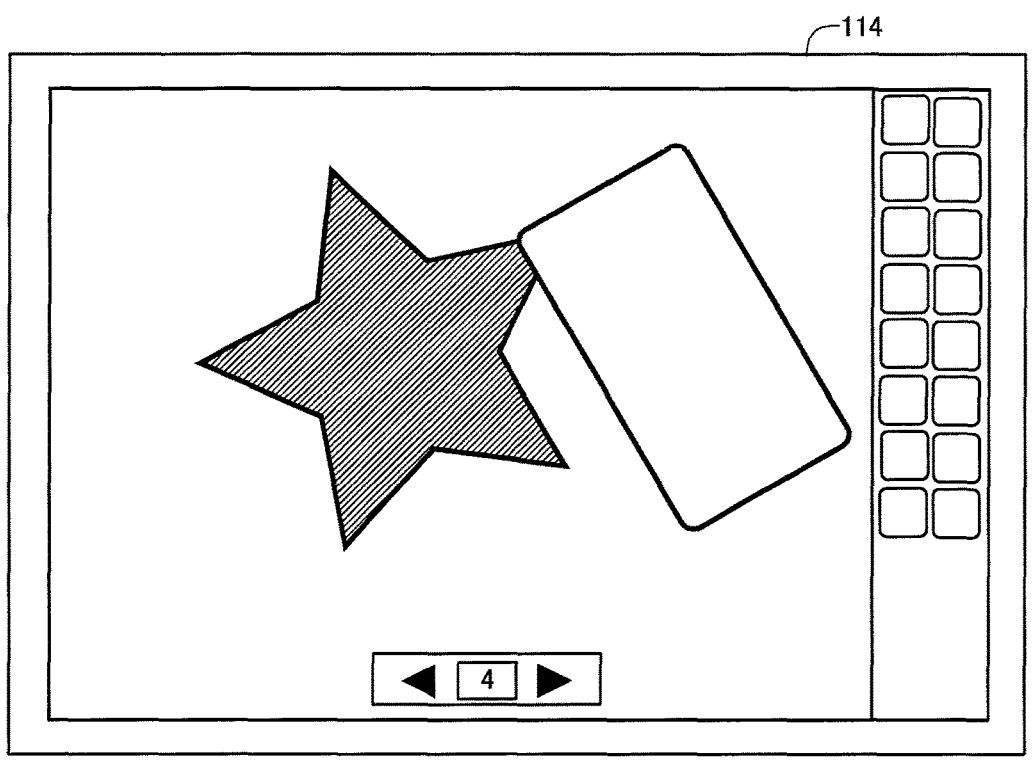
FIG. 12 shows a screen image after a page switch, displayed when an operation of sliding by a distance $D_2$ and then moving the fingers away is done, in accordance with the second embodiment of the present invention.

On the other hand, referring to FIG. 11, assume that after sliding his/her fingers by the distance $D_2$ ($D_{TH1} < D_2 \leq D_{TH2}$) to position 716, user 680 moves his/her fingers away from the display surface as shown by an arrow 712 and stops sliding. Immediately before the fingers are moved away, a right end portion 718 of the image of next page is displayed at the left end of the screen image, as in the example of FIG. 10. The width of right end portion 718 is substantially the same as distance $D_2$. When the fingers are moved away, here, the result of determination at step 610 becomes positive and the control proceeds to step 630. As the result of determination at step 630 is positive, at step 632, a process for feeding the screen image by one page to the right is executed. Specifically, as shown by an arrow 720 in FIG. 11, the image of the next page is scrolled to the right by one page, and the next page is displayed on display unit 114 as shown in FIG. 12. In the example shown in FIGS. 11 and 12, the screen image before movement is the third page, and the image after movement is the fourth page.

Referring to FIG. 8, thereafter, the control proceeds to step 600 and CPU 102 executes the process of monitoring the output of touch detecting unit 112 until the user touches the screen image next time.

Figure 13:
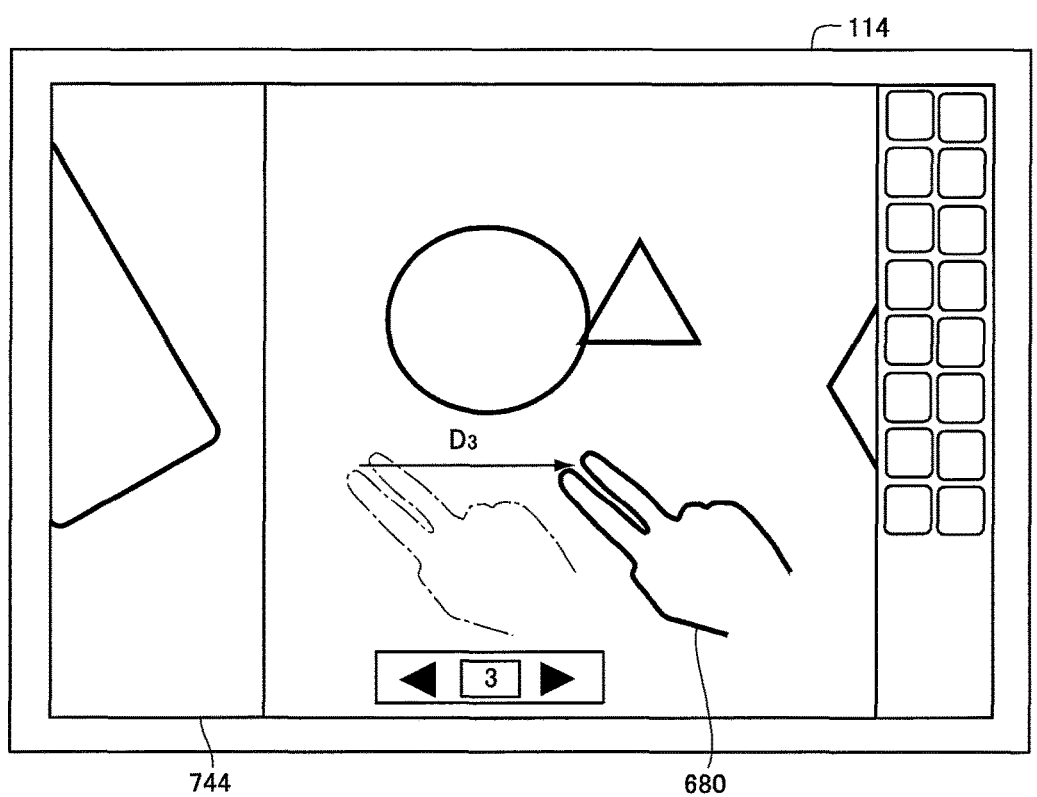
FIG. 13 shows a screen image displayed when an operation of sliding by a distance $D_3$ with multi-touch is done, in accordance with the second embodiment of the present invention.

Here, assume that different from the example of FIG. 10, even after sliding the fingers by the distance $D_2$, the user does not stop sliding but further continues sliding to the right. Here, the result of determination at step 610 is negative, and the control proceeds to steps 612, 620 and 622. Referring to FIG. 13, while the slid distance $D_3$ satisfies the relation $D_3 \leq D_{TH3}$, the determination at step 622 is negative. Therefore, at step 626, the screen image attains to the state in which the screen image is scrolled to the right by the distance $D_3$. In the example shown in FIG. 13, a right end portion 744 of the next screen image is displayed at the left end of the screen image. The width of right end portion 744 is substantially the same as distance $D_3$. Thereafter, the control returns to step 608, and the next repetition starts.

Figure 14:
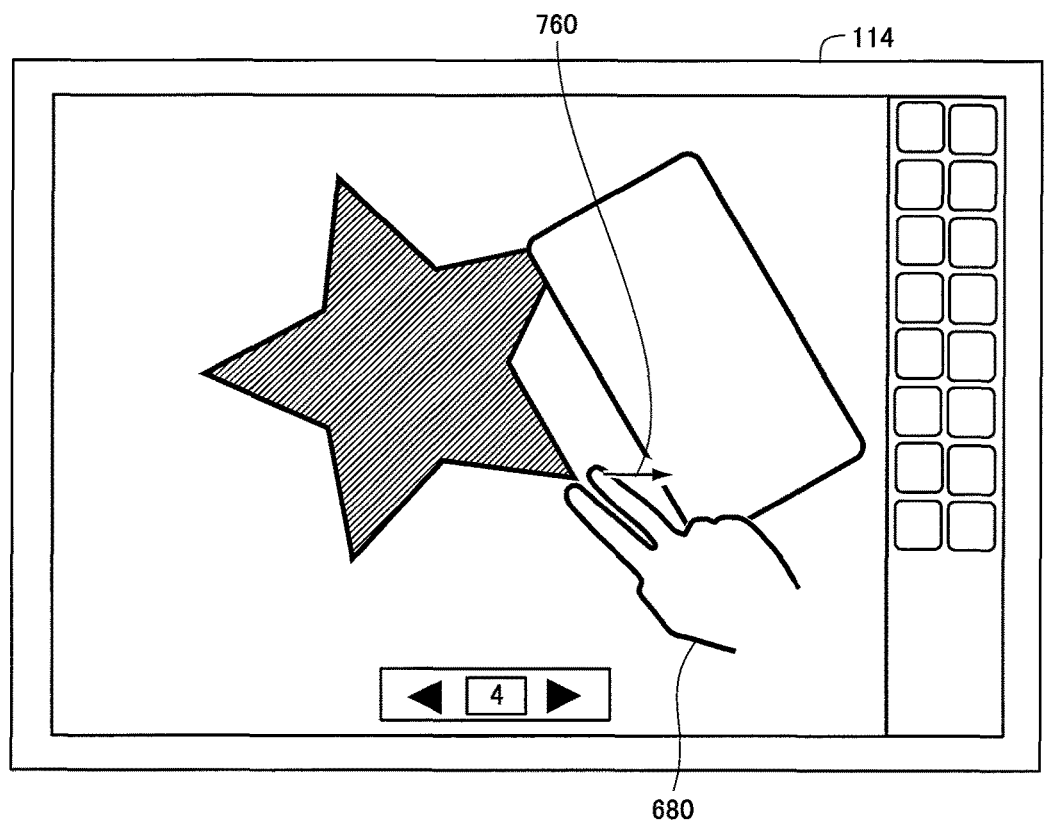
FIG. 14 shows a screen image displayed when the sliding operation is continued even after the screen image is switched by one page from the screen image shown in FIG. 13.

Assume that, in this state, the user 680 further continues sliding to the right and the distance $D_3$ becomes larger than the threshold value $D_{TH3}$. Here, the result of determination at step 622 becomes positive, and at step 624, the screen image is fed to the right by one page. Specifically, as shown in FIG. 14, the screen image of the fourth page is displayed on display unit 114. Thereafter, the control returns from step 624 to step 600, and the next position of touching by the user is detected. If the user 680 continues sliding of his/her fingers to the right as shown by an arrow 760, this sliding of the user is detected as a new touch at step 600. Therefore, through the process of steps 600, 602 and 604, the operation described above is repeated, using the position touched by the user 680 at the time point of page switching as a head position.

The description above relates to sliding by the user to the right direction. It is apparent from the description that similar operation takes place when the sliding is to the left. Therefore, detailed description thereof will not be repeated.

When an upward/downward sliding, a pinch-out or a pinch-in takes place with multi-touch, the control flows through steps 610, 612, 620 and 628 of FIG. 8 while the sliding is being done, and the process in accordance with the user operation is executed. If any operation is done with a single-touch, the control proceeds from step 604 to step 636. Until the finger is moved away, the control proceeds from step 640 to 642 if the operation is in drawing area 230, and by the process at step 642, an image is drawn at the finger position. If the operation is out of drawing area 230, nothing happens in the present embodiment.

If the finger is moved away in the single-touch operation, the control proceeds to steps 604, 636 and 638. At step 638, based on the first detected finger position and the finger position immediately before the finger is moved away, a process in accordance with these positions is executed. If it is the case that the user touched any of function buttons 242 and moved away the finger, a predetermined process corresponding to the touched function button 242 is executed at step 638.

As described above, in electronic blackboard apparatus 100 in accordance with the second embodiment, if the user slides his/her fingers in the lateral direction on the screen image with multi-touch, the operation is as follows. During sliding, the screen image is scrolled in accordance with the amount of sliding. When the fingers are removed after sliding by the distance $D_1$ and the distance $D_1$ is equal to or smaller than the threshold value $D_{TH1}$, scroll is cancelled and the screen image before sliding is resumed. If the distance $D_1$ is larger than the threshold value $D_{TH1}$, the screen image if moved by one page. In the second embodiment described above, the next page is displayed when slid to the right, and the previous page is displayed when slid to the left.

If the user slides his/her fingers by a distance longer than the threshold value $D_{TH1}$, and the slid distance $D_1$ is equal to or smaller than $D_{TH3}$, page switch does not takes place, and the screen image is scrolled in accordance with the amount of sliding. If the distance $D_1$ exceeds the threshold value $D_{TH3}$, page switch automatically takes place. If sliding is further continued, the same operation as when sliding is newly started is executed.

According to the second embodiment, if sliding is done with multi-touch, the screen image is scrolled. Therefore, it is possible for the user to intuitively understand that the screen image can be scrolled by a multi-touch operation. If touching fingers are removed in the course of multi-touch sliding and the amount of sliding is small, the scroll is canceled and the original screen image is resumed. Even if multi-touch sliding operation is done erroneously during writing on the screen image, the screen image returns to the normal state immediately when the fingers are moved away. Therefore, even when an erroneous operation is done, the influence on the writing operation is small. On the other hand, if the fingers are moved away after sliding over a certain distance, switching to the next page (page feed) occurs. Therefore, the page feed can be realized by an intuitive operation of multi-touch sliding operation. If sliding is further continued with the fingers kept touched on the screen, page feed is automatically executed while sliding continues, and the sliding operation can further be continued. Therefore, advantageously, the operation of continuous page feed is made simple.

In the second embodiment described above, it is determined at step 610 of FIG. 8 that sliding ended if only one of multi-touching fingers is moved away from the input screen image. The present invention, however, is not limited to such an embodiment. It may be determined that sliding ended only when all fingers are moved away. In other words, if it is a multi-touch operation when sliding starts, sliding may be continued thereafter even when the multi-touching is lost, and similar effects as in the embodiment above can be attained.

Further, in the second embodiment described above, determination as to whether an operation is a multi-touch operation or not is made at step 604 of FIG. 8, and if it is determined not to be a multi-touch operation, a process such as drawing, different from the page switching or scroll process is executed. The present invention, however, is not limited to such an embodiment. By way of example, the process of page switching or scroll may be executed only when the operation is a multi-touch with three or more fingers, and, if touched by one or two fingers, a process such as drawing, other than the page switching or scroll may be executed even if it is a multi-touch with two fingers. Generally speaking, the process of page switching or scroll may be executed only when the operation is a multi-touch with N fingers, and a process such as drawing, other than the page switching or scroll may be executed even if it is a multi-touch with N−1 or smaller number of fingers, with N being an integer larger than 1.

Further, as to the method of calculating the distance $D_1$, use of the average value of amounts of movement of a plurality of fingers in the second embodiment is not limiting. By way of example, the amount of movement may be calculated based on only the first detected one finger position. Further, threshold values $D_{TH1}$ and $D_{TH2}$ mentioned above may be changed in accordance with the speed of movement of finger positions during sliding.

In the second embodiment described above, it is assumed that sliding and page turning are along the lateral direction (X axis direction) of the screen image. It is clear that the present invention is not limited to such an embodiment. For instance, the direction of sliding and page turning may be the upward/downward direction (Y axis direction). Sliding may be done in consideration of both X and Y axes directions. In other words, the present invention is applicable to an embodiment allowing sliding in a diagonal direction. Here, the first and second threshold values may be determined separately for the X axis direction and Y axis direction, or determined to be the same regardless of the direction. Further, the length of sliding may not be divided to components in the X axis direction and Y axis direction, and whether a page is to be turned or not may be determined based on the length of the track of sliding (distance between the start point and end point).

Though an example of drawing and sliding with a finger or fingers has been described in the second embodiment above, the present invention is not limited to such an embodiment. For example, a dedicated pen may be used. As to the method of detecting a touched position on the touch-panel, any method may be used provided that touching at a plurality of positions can be detected.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image display apparatus allowing touch-input, comprising:
   a touch detecting unit that has a display screen, displays page images page by page on the display screen, and detects positions and a number of touch inputs that designate positions on said display screen;
   a scroll unit that scrolls, when a plurality of touch inputs are detected by said touch detecting unit and their positions on the display screen move in one same direction, an image displayed on said display screen along with movement of positions of said plurality of touch inputs; and
   a first page switching unit that switches the image on said display screen by one page in accordance with the direction of movement of said plurality of touch inputs in response to an amount of movement of the touch inputs becomes larger than a first threshold value after the plurality of touch inputs are detected by said touch detecting unit;
   wherein the first page switching unit detects, after the plurality of touch inputs are detected by said touch detecting unit, whether the number of touch inputs being decreased to zero, from an output of said touch detecting unit, and at a time when the number of touch inputs is decreased to zero: if an amount of movement of the touch inputs is not larger than a second threshold value smaller than the first threshold value, executes a process of returning the image on said display screen to a state before scrolling, and if an amount of movement of the touch inputs is equal to or greater than the second threshold value and equal to or smaller than the first threshold value, executes a process of switching the image by one page in accordance with the direction of movement of the plurality of touch inputs, and
   wherein after the plurality of touch inputs are detected by said touch detecting unit, when decrease in the number of touch inputs is detected from an output of said touch detecting unit, even if an amount of movement of the touch inputs is not larger than the first threshold value, scrolling is maintained as long as at least one touch input is maintained.

2. A controller for a display apparatus, used for the display apparatus that has a display screen, displays an image received from outside on the display screen and detects and outputs, to the outside, positions and a number of touch inputs that designate positions on said display screen, comprising:
   a scroll unit that generates, when it is detected that a plurality of touch inputs are detected by said display apparatus and their positions on the display screen move in one same direction, an image by scrolling the image displayed on said display screen along with the movement of positions of said plurality of touch positions, and applies the generated image to said display apparatus;
   a page switching unit that switches the image on said display screen by one page in accordance with the direction of movement of said plurality of touch inputs in response to an amount of movement of the touch inputs becomes larger than a first threshold value after the plurality of touch inputs are detected by said display apparatus;
   the page switching unit detects, after the plurality of touch inputs are detected by said display apparatus, whether the number of touch inputs being decreased to zero, from an output of said display apparatus, and at a time when the number of touch inputs is decreased to zero: if an amount of movement of the touch inputs is not larger than a second threshold value smaller than the first threshold value, executes a process of generating page image data for returning the image on said display screen to a state before scrolling, and if an amount of movement of the touch inputs is equal to or greater than the second threshold value and equal to or smaller than the first threshold value, executes a process of switching the image by one page in accordance with the direction of movement of the plurality of touch inputs, and transmits the generated page image data to said display apparatus, wherein after the plurality of touch inputs are detected by said display apparatus, when decrease in the number of touch inputs is detected from an output of said display apparatus even if an amount of movement of the touch inputs is not larger than the first threshold value, scrolling is maintained as long as at least one touch input is maintained.

3. An image display apparatus allowing touch input, comprising:

a touch detecting unit that has a display screen, displays page images page by page on the display screen, and detects positions and a number of touch inputs that designate positions on said display screen;

a scroll unit that scrolls, when a plurality of touch inputs are detected by said touch detecting unit and their positions on the display screen move in one same direction, an image displayed on said display screen along with movement of positions of said plurality of touch inputs;

a first page switching unit that switches the image on said display screen by one page in accordance with the direction of movement of said plurality of touch inputs in response to an amount of movement of the touch inputs becomes larger than a first threshold value after the plurality of touch inputs are detected by said touch detecting unit;

a returning unit that detects, from an output of said touch detecting unit, whether the number of said plurality of touch inputs being decreased to zero, and at a time when the number of touch inputs is decreased to zero: if an amount of movement of the touch inputs is not larger than a second threshold value smaller than the first threshold value, returns scrolling of the image by said scroll unit to a state before scrolling, and if an amount of movement of the touch inputs is equal to or greater than the second threshold value and equal to or smaller than the first threshold value, executes a process of switching the image by one page in accordance with the direction of movement of the plurality of touch inputs, wherein after the plurality of touch inputs are detected by said touch detecting unit, when decrease in the number of touch inputs is detected from an output of said touch detecting unit and, even if an amount of movement of the touch inputs is not larger than the first threshold value, scrolling is maintained as long as at least one touch input is maintained.

4. A controller for a display apparatus, used for the display apparatus that has a display screen, displays an image received from outside on the display screen and detects and outputs, to the outside, positions and a number of touch inputs that designate a position on said display screen, comprising:

a scroll unit that generates, when it is detected that a plurality of touch inputs are detected by said display apparatus and their positions on the display screen move in one same direction, an image by scrolling the image displayed on said display screen along with the movement of positions of said plurality of touch positions, and applies the generated image to said display apparatus;

a first page switching unit that switches the image on said display screen by one page in accordance with the direction of movement of said plurality of touch inputs in response to an amount of movement of the touch inputs becomes larger than a first threshold value after the plurality of touch inputs are detected by said display apparatus; and a returning unit that detects, from an output of said display apparatus, whether the number of said plurality of touch inputs being decreased to zero, and at a time when the number of touch inputs is decreased to zero: if an amount of movement of the touch inputs is not larger than a second threshold value smaller than the first threshold value, returns scrolling of the image by said scroll unit to a state before scrolling, and if an amount of movement of the touch inputs is equal to or greater than the second threshold value and equal to or smaller than the first threshold value, executes a process of switching the image by one page in accordance with the direction of movement of the plurality of touch inputs, wherein after the plurality of touch inputs are detected by said display apparatus, when decrease in the number of touch inputs is detected from an output of said display apparatus and, even if an amount of movement of the touch inputs is not larger than the first threshold value, scrolling is maintained as long as at least one touch input is maintained.

5. A display control method of an image display apparatus that allows touch-input, comprising:

displaying page images page by page on a display screen, and detecting positions and a number of touch inputs that designate positions on said display screen;

scrolling, when a plurality of touch inputs are detected and their positions on the display screen move in one same direction, an image displayed on said display screen along with movement of positions of said plurality of touch inputs;

after the plurality of touch inputs are detected, in response to an amount of movement of the touch inputs becomes larger than a first threshold value, switching the image on said display screen by one page in accordance with the direction of movement of said plurality of touch inputs; and detecting, after the plurality of touch inputs are detected, whether the number of touch inputs being decreased to zero, and at a time when the number of touch inputs is decreased to zero: if an amount of movement of the touch inputs is not larger than a second threshold value smaller than the first threshold value, executes a process of returning the image on said display screen to a state before scrolling, and if an amount of movement of the touch inputs is equal to or greater than the second threshold value and equal to or smaller than the first threshold value, executes a process of switching the image by one page in accordance with the direction of movement of the plurality of touch inputs, wherein when a decrease in the number of touch inputs is detected after the plurality of touch inputs are detected, even if an amount of movement of the touch inputs is not larger than the first threshold value, scrolling is maintained as long as at least one touch input is maintained.

6. A display control method of an image display apparatus that allows touch-input, comprising:
displaying page images page by page on a display screen, and detecting positions and a number of touch inputs that designate positions on said display screen;
scrolling, when a plurality of touch inputs are detected and their positions on the display screen move in one same direction, an image displayed on said display screen along with movement of positions of said plurality of touch inputs;
after the plurality of touch inputs are detected, in response to an amount of movement of the touch inputs becomes larger than a first threshold value, switching the image on said display screen by one page in accordance with the direction of movement of said plurality of touch inputs;
detecting, from the detected plurality of touch inputs, whether the number of said plurality of touch inputs being decreased to zero, and at a time when the number of touch inputs is decreased to zero: if an amount of movement of the touch inputs not larger than a second threshold value smaller than the first threshold value, returning scrolling of the image to a state before scrolling, and if an amount of movement of the touch inputs is equal to or greater than the second threshold value and equal to or smaller than the first threshold value, executes a process of switching the image by one page in accordance with the direction of movement of the plurality of touch inputs,
wherein when a decrease in the number of touch inputs is detected after the plurality of touch inputs are detected, even if an amount of movement of the touch inputs is not larger than the first threshold value, scrolling is maintained as long as at least one touch input is maintained.

* * * * *